United States Patent [19]

Chapin et al.

[11] 4,277,771
[45] Jul. 7, 1981

[54] ELECTRIC INDUCTION FIELD NAVIGATION APPARATUS

[75] Inventors: Lawrey H. Chapin, Glendora, Calif.; Robert O. Maze, Minneapolis, Minn.

[73] Assignee: Honeywell Inc., Minneapolis, Minn.

[21] Appl. No.: 410,830

[22] Filed: Nov. 9, 1964

Related U.S. Application Data

[63] Continuation of Ser. No. 14,164, Mar. 4, 1960, abandoned.

[51] Int. Cl.³ .............................................. G01S 3/78
[52] U.S. Cl. ........................... 340/27 NA; 343/112 R
[58] Field of Search ................ 343/112, 117.1, 101.2, 343/112 R; 340/26, 27, 4, 27 NA; 324/72, 109, 334, 344; 33/356

[56] References Cited

U.S. PATENT DOCUMENTS

| | | | |
|---|---|---|---|
| 2,597,135 | 5/1952 | Stuart, Jr. .............................. | 33/356 |
| 3,087,111 | 4/1963 | Lehan et al. .......................... | 324/344 |
| 3,136,943 | 6/1964 | Slichter ................................. | 324/344 |
| 3,204,183 | 8/1965 | Hasenzahl ........................ | 324/109 X |
| 3,218,623 | 11/1965 | Buntenbach ........................ | 324/72 X |
| 3,430,243 | 2/1969 | Evans ................................. | 343/112 R |
| 3,866,111 | 2/1975 | Warren ................................ | 324/334 |

Primary Examiner—T. H. Tubbesing
Attorney, Agent, or Firm—Charles J. Ungemach

[57] ABSTRACT

Apparatus for use by the operator of an aircraft in guiding the aircraft, in areas where electric power lines are in operation. Pickup means are located at three or more locations on the aircraft and are used to detect three orthogonal components of the "near field" of the power line, the radiation field at 60 cycles per second being negligible. These components are fed through suitable computing and indicating means to direct the operator in flying the aircraft so that it approaches and then follows the power line, by displaying the angle between craft heading and power line direction, and the craft distance from the power line.

15 Claims, 10 Drawing Figures

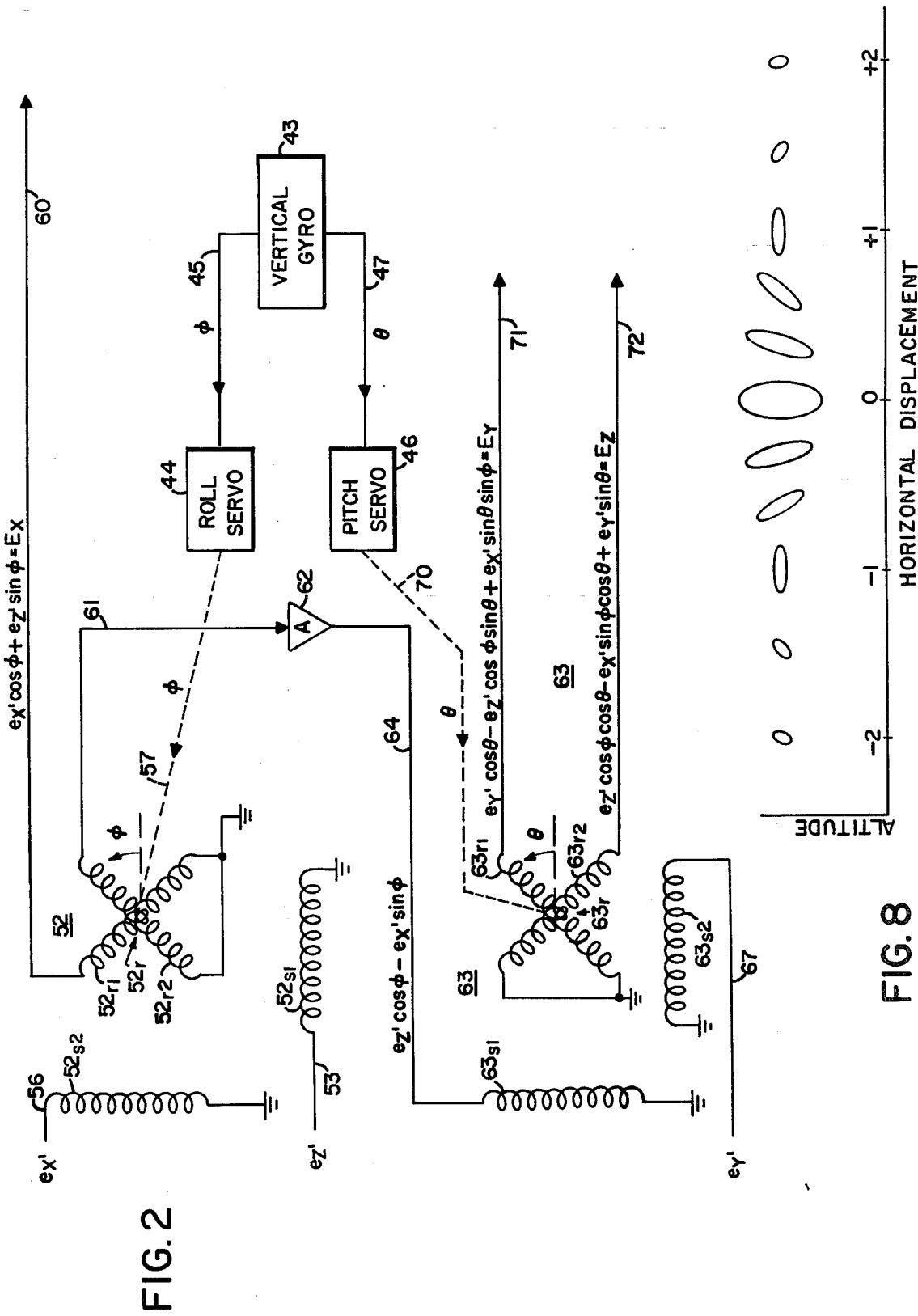

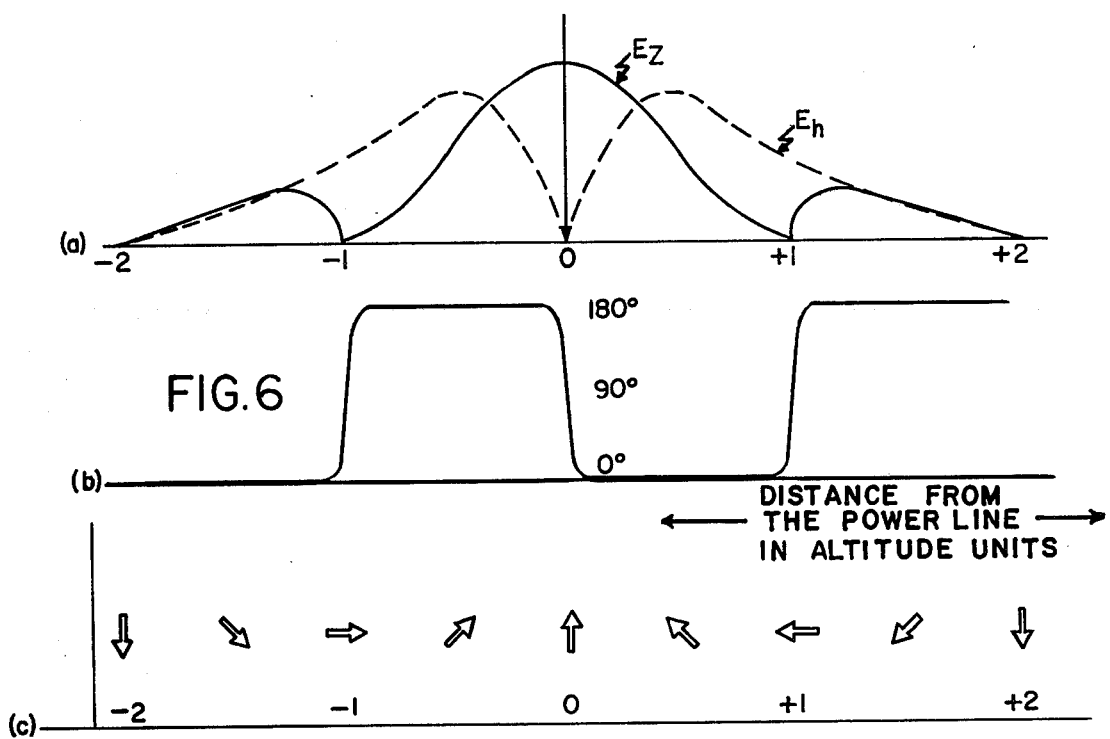
FIG. 6
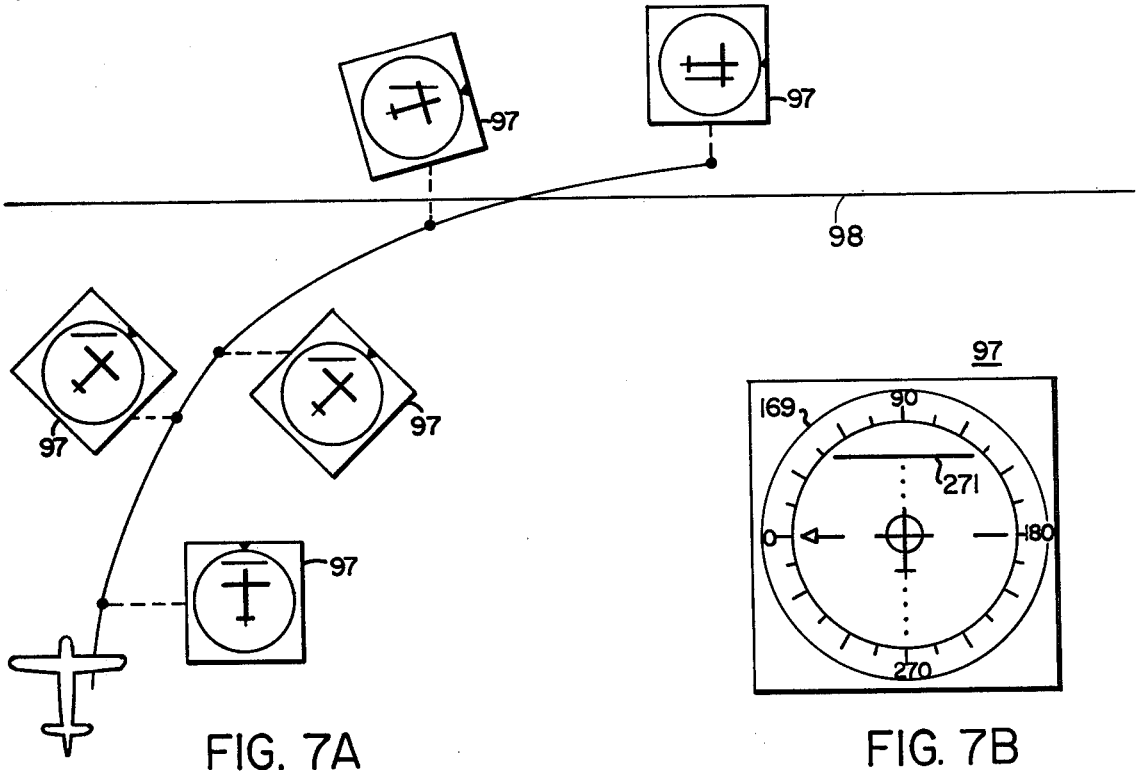
FIG. 7A
FIG. 7B

ELECTRIC INDUCTION FIELD NAVIGATION APPARATUS

This application is a continuation of Ser. No. 14,164 assigned to the assignee of the present application filed Mar. 4, 1960 and now abandoned.

This invention relates generally to the field of control apparatus and more specifically to apparatus for detecting the presence of high voltage transmission lines as a navigational aid for dirigible craft such as aircraft. There is a present need for a guidance system of high accuracy which can provide distance and directional information to an aircraft, the information being used for accurate navigation fixes. The system should be completely passive, relatively simple, and effective against any known countermeasure or noise. The present invention provides a system which detects the electric field surrounding high voltage power transmission lines located miles away laterally or vertically, and is capable of accomplishing the above recited desired results.

Functionally the invention comprises apparatus capable of deriving controlled signals from an electric induction field by means of which the position or orientation of the apparatus with respect to the source of the field may be determined. By way of illustration a conventional power transmission line is taken as a suitable induction field source: such lines transmit AC power over long distances and of course their physical location is known and unchanging.

As is well known, any conductor transmitting alternating electric energy is surrounded by detectable energy fields, the nature of which depends on the distance from the conductor and the frequency of the alternation. A portion of the energy supplied to the conductor appears as an alternating induction field surrounding the conductor, while a second portion of that energy appears as a radiation field emanating from the conductor. The induction field predominates over the radiation field for distances from the conductor of less than $\lambda/2\pi$ where $\lambda$ is wave length: for a frequency of 60 cycles per second $\lambda/2\pi$ is approximately 500 miles. Since the present invention contemplates operation very much closer than 500 miles to the conductor, the far zone or radiation field is not significant, and all further comments herein refer to the induction or near zone field.

The induction field has two components, an electric one and a magnetic one. It has been found that the magnetic induction field is a function of the current flow in the conductor: for power lines this means that the magnetic induction field varies unpredictably with the load on the line, and is hence undesirable. On the other hand, every effort is continually made to maintain the line voltage at a constant value, and the electric induction field, which is related to the line voltage, is thus of constant amplitude and therefore is a desirable signal source.

It is of course true that power transmission lines ordinarily comprise more than a single conductor. It has been found experimentally, however, that the electric induction field surrounding even a three-phase power line with further ground wires may be represented at any given point in space by a vector rotating as a function of time in a plane perpendicular to the length of the line. As the field vector rotates, it also changes in amplitude so that the head of the rotating vector describes an ellipse. The size, shape and orientation of the ellipse varies according to the position of the aircraft with respect to the line, the line configuration, and the voltage of the line. By the use of suitably oriented sensors or electrodes on the aircraft, the electric induction field vector at any particular point in space may be resolved into its horizontal and vertical components. The amplitude of the vertical and horizontal components and the time phase difference between them are useful to calculate or determine the position and orientation of the aircraft with respect to the line.

Generally, the field strength is directly proportional to the line voltage. Also, the field decreases as a function of the distance from the line. Another useful parameter is that the vertical component of the field over the line is inversely proportional to the square of the altitude. The horizontal component of the field over the line varies approximately inversely with the cube of the altitude. As will be discussed in more detail below, the vertical component becomes maximum at a point directly over the line and approaches zero at a lateral displacement which corresponds to $\pm 45°$ displacement of the slant line, from the aircraft to the transmission line with respect to a vertical. Also of primary significance is the phase angle between the horizontal and vertical components of the field. The slope of the phase characteristic directly above the line is quite steep and offers an accurate source of positional information.

The present invention is based on the concept that the orientation of the ellipse axes and the altitude provide a means of measuring the distance from the dirigible craft to the line. It can be shown that the ellipse is always oriented horizontally whenever the aircraft is located a distance from the line approximately equal to the altitude, while directly above the line the ellipse is seen to have rotated through 90° and is always oriented vertically. As the aircraft is displaced on the opposite side of the line, the ellipse axes continue their rotation and therefore the angular position of the ellipse axes offers a relative measurement of lateral distance from the line. The amplitudes of the two field components also offer additional information, and the acquisition and identification of the transmission line can best be accomplished by monitoring signal strength. The horizontal field amplitude is greater than that of the vertical field at long range, and therefore provides the best indication of signal acquisition. The present invention senses the electric field, transforms the signals from signals derived in an air frame reference system into signals descriptive of an earth reference system, computes the relative distance to the line and the relative bearing to the line, and displays the information for the use of a pilot in a piloted aircraft or provides suitable control signals for a pilotless aircraft.

It is therefore a general object of the present invention to provide an improved navigation system for a dirigible craft.

Another object of the present invention is to provide apparatus for detecting the presence of electric induction fields about a high power transmission line.

Another object of the present invention is to provide apparatus on a dirigible craft for detecting the presence of an electric induction field about a transmission line and computing the relative bearing of the craft from the transmission line.

A further object of the present invention is to provide apparatus on a dirigible craft for detecting electric induction fields about a transmission line and computing the relative distance of the craft from the transmission line.

Another object of the present invention is to provide a device on a dirigible craft which detects the presence of an electric field about a transmission line and displays the relative bearing and direction information to a pilot of the craft.

Still a further object of the present invention is to provide an apparatus for detecting the presence of an electric induction field and converting this information into usable control signals to provide a control function for a dirigible craft.

Another object of the present invention is to provide apparatus for detecting the presence of an electric induction field about a transmission line and providing suitable means to automatically control a dirigible craft so as to follow a course directly above the line.

It is yet another object of the present invention to provide apparatus for detecting the presence of an electric field about a transmission line wherein the apparatus automatically recycles itself after passing beyond the field of a line.

These and other features of the invention will be understood more clearly and fully from the following detailed description and appended claims in conjunction with the accompanying drawing in which:

FIG. 2 is a schematic diagram of the roll and pitch coordinate transformation computer;

FIG. 6(a) is a diagramatic showing of the relative magnitudes of the horizontal component ($E_h$) and the vertical component ($E_Z$) of the electric field as sensed at the aircraft, plotted as functions of horizontal distance away from the line (in altitude units);

FIG. 6(b) is a diagramatic showing of the phase relationship between $E_Z$ and $E_h$ as a function of horizontal distance away from the line (in altitude units);

FIG. 6(c) is a diagramatic showing of the electric field vector orientation as a function of horizontal distance away from the line (in altitude units);

The phase relationship shown in FIG. 6(b) is for the high altitude case where the two components are either substantially in phase or 180° out of phase. For this case the previously mentioned ellipse would degenerate into a straight line and the field vector would be oriented as shown in FIG. 6(c). For the case of lower altitudes the phase difference between the two field components does not change as rapidly with horizontal distance from the line. The phase difference does not approach 180° or 0° except at an infinite horizontal distance on either side of the line. For this case the field vector generates the previously discussed ellipse which has its principal axis oriented as a function of horizontal displacement from the line as shown in FIG. 8.

FIG. 7A depicts an aircraft approaching a transmission line and shows the different indicator presentations for different positions of the aircraft relative to the transmission line;

FIG. 7B shows in detail the face or dial of an indicator which may be used with the present invention; and FIG. 8 depicts the orientation of the electric field ellipse at different points in space at a fixed altitude as a function of horizontal displacement away from the line.

Figure 1A:
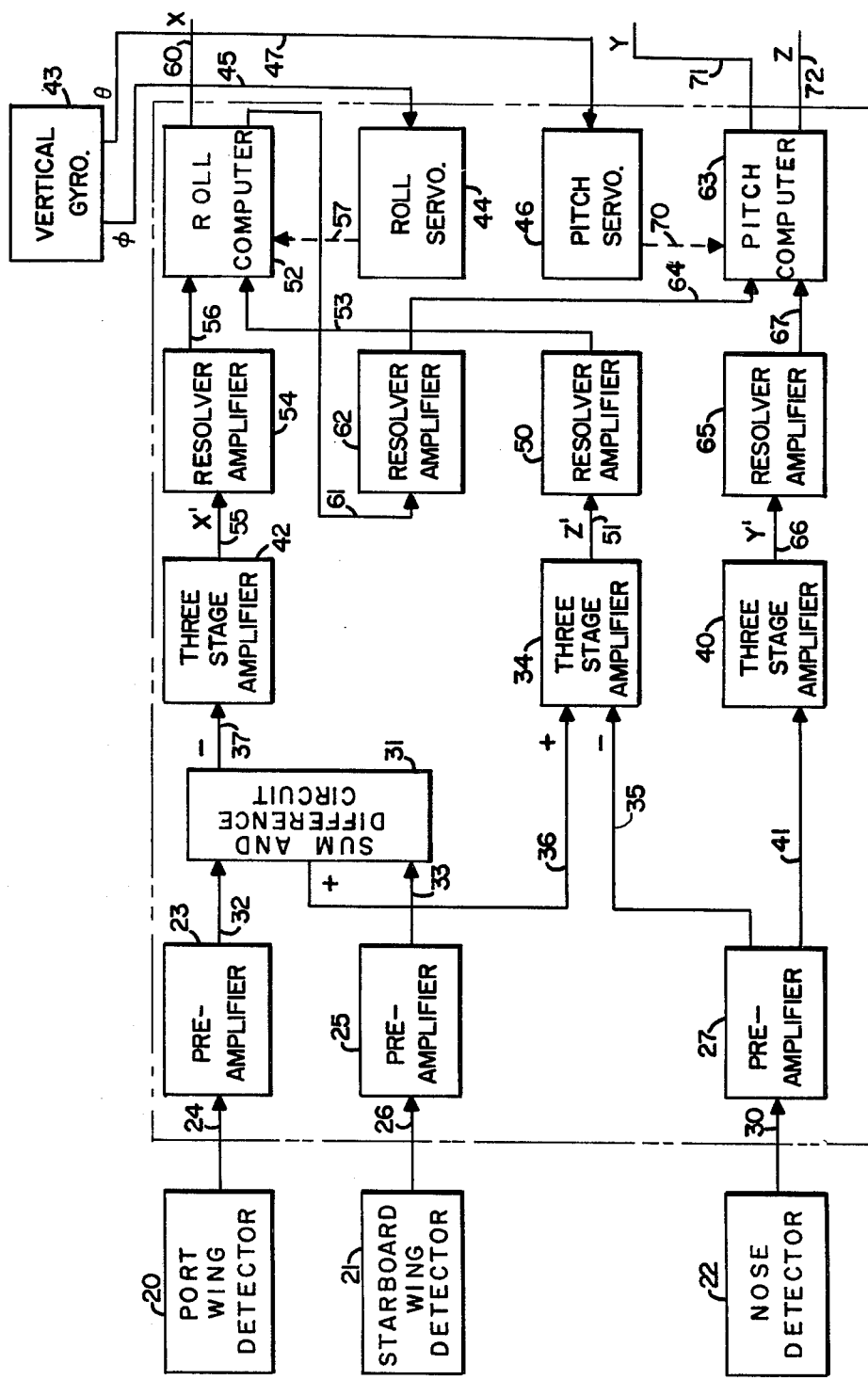
FIG. 1A is a block diagram showing the portion of the apparatus which derives the three signal components describing the electric field about a line with respect to an aircraft.
Figure 1B:
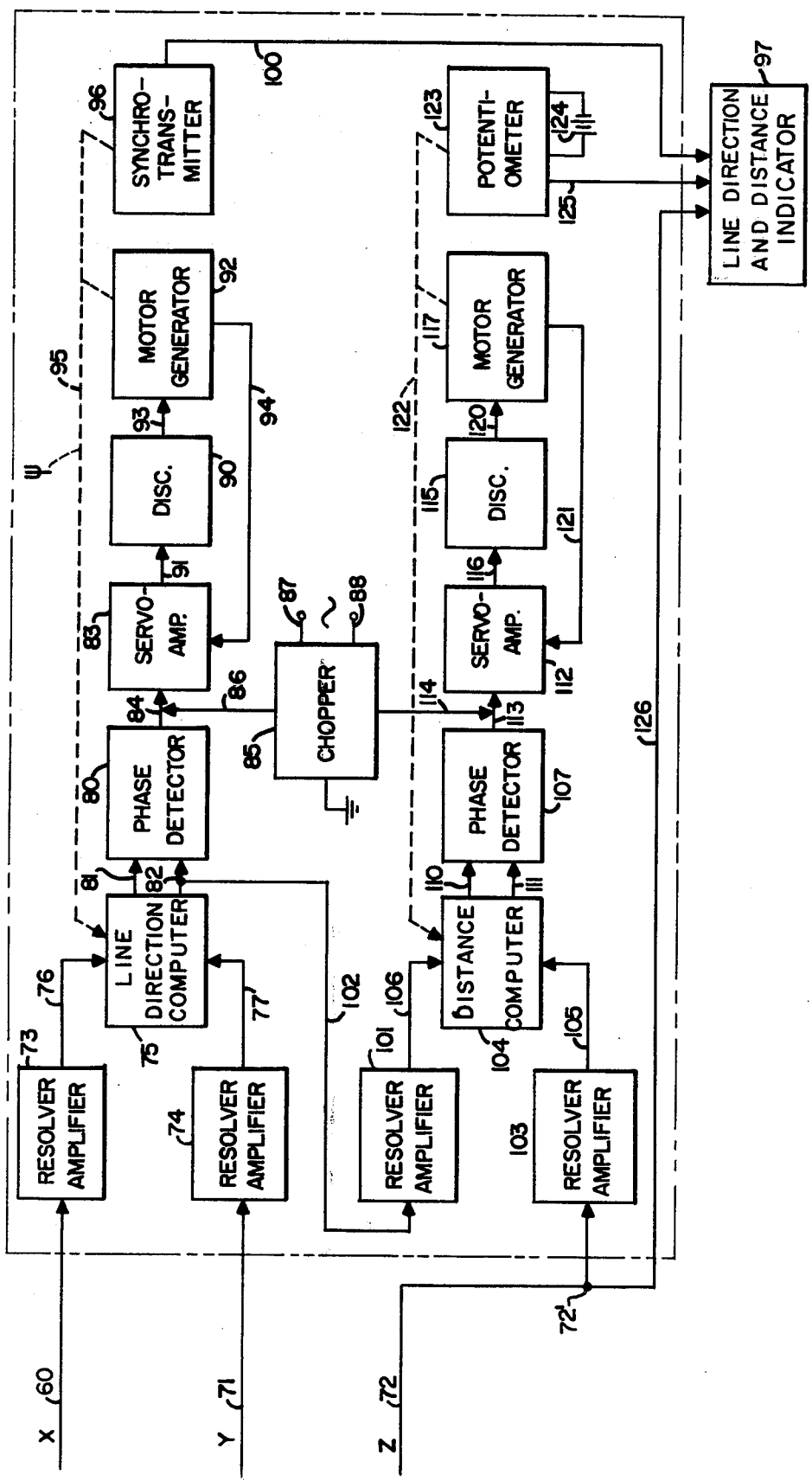
FIG. 1B is a block diagram of the apparatus receiving the three signal components representative of the electric field and computing and displaying the relative distance to the line and relative bearing to the line.

FIGS. 1A and 1B when combined show the overall block diagram of the electric field detection apparatus.

In the practice of the invention it is desired to derive signals representative of those components of the alternating electric induction field which are directed orthogonally along the principal axes of the aircraft. The longitudinal axis is designated as the Y' axis, positive in the forward direction, the vertical axis is designated as the Z' axis, positive in an upward direction, and the lateral axis is designated as the X' axis, positive toward the starboard wing. The field is sensed by a plurality of field detectors of any suitable type, as discussed in more detail below, mounted in suitable locations on the aircraft. In theory it may be possible to find, for any particular aircraft, three sensor locations which make it possible to derive signals severally representative solely of single ones of the orthogonal components desired. In practice, however, the asymmetry of aircraft shapes and the restrictions imposed by the presence of engines, radar equipment, etc. make some of these locations unusable. Nevertheless by positioning the detectors as near the ideal locations as practical it is possible to obtain induction field component signals containing a relatively small proportion of distortion due to other field components, which distortion may be removed by judicious circuit design.

The embodiment of the invention shown in the drawing includes port and starboard wing detectors 20 and 21 and a nose detector 22. Detector 22 is positioned substantially at the center or neutral plane of symmetry of the aircraft in the Z axis direction. This is easily accomplished by giving the nose detector the form of a cuplike conducting element mounted on and insulated from the nose of the aircraft with the principal axis of the cup parallel to the longitudinal or Y' axis of the aircraft. Detectors 20 and 21 may comprise conductive sheets mounted on and insulated from the external wing tanks of the aircraft: by this arrangement detectors 20 and 21 are equally spaced from the Z' axis neutral plane in the same direction and by the same amount, but are spaced from the Y' axis neutral plane in opposite directions by the same amount.

Each of detectors 20, 21 and 22 is in fact a parallel plate capacitor, the plates being separated by dielectric material of a desired thickness. In each capacitor the skin of the aircraft comprises one of the plates. If such a condenser is exposed to an electric field, a voltage appears between the plates dependent in amplitude on the gradient of the field.

This type of field gradient detector is readily understood by those skilled in the art: further reference may also be had to page 42 of UHF PRACTICES AND PRINCIPLES, 1st Edition, by Alan Lytel.

In the illustrated embodiment of the invention both the lateral component and the vertical component may be derived from wing detectors 20 and 21. The lateral component is obtained by subtracting the detector signals, when the equal vertical components of like sense cancel out. Any unavoidable forward components of the detector signals are also equal and of like sense, and hence cancel out also. The vertical component is obtained by addition of the detector signals, when the equal lateral components of opposite sense cancel out. Any unavoidable forward components of the detector signals do not cancel out here, and must be removed by subtracting an appropriate amount of the signal derived from nose detector 22, as will presently be described.

To accomplish the above, detector 20 is connected to a preamplifier 23 by a lead 24, detector 21 is connected to a preamplifier 25 by a lead 26, and detector 22 is connected to a preamplifier 27 by a lead 30. Preamplifiers 23 and 25 are connected by leads 32 and 33 to a sum and difference circuit 31 which produces a pair of outputs on leads 36 and 37. Circuit 31 may be of any suitable type. One arrangement not shown specifically is to have a pair of amplifiers one of which receives the signal from the preamplifier 23 and the other of which receives the signal from preamplifier 25: suitable means not shown in detail are provided for adding and for subtracting the amplifier outputs to give the sum and difference signals on leads 36 and 37.

A three-stage amplifier 34 is connected to receive the summation or vertical component signal on lead 36, and is also connected to receive a portion of the forward signal from preamplifier 27 on a lead 35: the latter signal is opposite in phase to the former so as to oppose it, and by suitable selection of components may be made just sufficient to cancel any undesired forward component error in the vertical component signal on lead 36.

A second three-stage amplifier 40 is connected to receive the full forward component from preamplifier 27 on a lead 41 and a third three-stage amplifier 42 is connected to receive the difference or lateral component signal from sum and difference circuit 31 on a lead 37. The amplifiers 34, 40 and 42 are conventional in detail and each has gain varying means. Thus the signals emerging from the amplifiers 34, 40 and 42 comprise a set of alternating voltages whose magnitudes and phase relationships are indicative of the magnitudes and phase relationships of the electric field components Z', Y', and X' parallel to the aircraft orthogonal axes. The means for varying the gain and tuning the various stages of amplification have not been shown since they are well known to those skilled in the art and, if shown, would primarily tend to obscure the material portion of the invention.

Since the signals detected are orthogonal signal coordinates in an air frame reference they must be transformed to a reference frame which is oriented to a transmission line or an earth coordinate axis system. The well known fact that the electric induction field around the transmission line has no component parallel to the line makes the transformation simpler: a vertical reference such as a vertical gyro 43 which is located in the aircraft is sufficient to perform the transformation. Under these conditions it is only required to transform the X' signal through a roll angle $\phi$, to transform the Y' signal through a pitch angle $\theta$ and to transform the Z' signal through a roll angle $\phi$, followed by a pitch angle $\theta$. Therefore an electrical signal representative of roll angle $\phi$ is applied to a suitable roll servomotor 44 from vertical gyro 43 through a connecting lead 45. In like manner, an electrical signal representative of pitch angle $\theta$ is applied to a suitable pitch servomotor 46 through a connecting lead 47. A resolver amplifier 50 is excited by the Z' signal from amplifier 34 through a connecting lead 51. Another resolver amplifier 54 is excited by the X' signal from amplifier 42, the signal being applied through a connecting lead 55. A roll computer 52 which is in the form of a conventional resolver synchro has the amplified Z' signal applied to one of its inputs through a connecting lead 53 and the amplified X' signal applied to another of its inputs through a lead 56. Roll computer 52 along with vertical gyro 43 and the roll servo 44 are also shown in FIG. 2 and will be explained in more detail below. Roll servo 44 is driven to a position representative of roll angle $\phi$ and roll computer 52 is connected to roll servo 44 through a mechanical connection 57 and this motion is imparted to roll computer 52 to produce a pair of outputs on a pair of output connecting leads 60 and 61.

A resolver amplifier 65 has applied thereto a Y' signal received from amplifier 40 through a connecting lead 66. Another resolver amplifier 62 receives a signal from roll computer 52 through connecting lead 61 and the output of amplifier 62 is applied to pitch computer 63 through a connecting lead 64. The amplified Y' signal is applied to pitch computer 63 through a connecting lead 67. Pitch servo 46 is driven to a position representative of pitch angle $\theta$ and pitch computer 63 is mechanically connected to the pitch servo 46 through a mechanical connection 70 to produce a pair of outputs on a pair of output leads 71 and 72 respectively. The output appearing on lead 60 is representative of the electric field component along the X axis referred to the earth coordinate system, and the outputs appearing on leads 71 and 72 are representative of the electric field components along the Y and Z axes referred to the earth coordinate system.

Referring now to FIG. 1B, a resolver amplifier 73 has the signal representative of the X component of the electric field applied to its input through connecting lead 60. A resolver amplifier 74 receives an input signal through connecting lead 71, the signal being representative of the component of the electric field lying along the Y axis. A line direction computer 75 has a first input signal applied thereto from resolver amplifier 73 through a connecting lead 76 and has another input signal applied thereto from resolver amplifier 74 through a connecting lead 77. Line direction computer 75 determines the angle $\psi$ between the power line and the horizontal projection of the aircraft heading, by solving the equation $$\tan \psi = (-E_Y/E_X)$$

The line direction computer is shown in more detail in FIG. 3 which is discussed below. In general, the line direction computer is a part of a system which also includes a phase detector 80 and a servo system including a servo amplifier 83, a discriminator 90, a motor generator 92, and a synchro transmitter 96. A pair of leads 81 and 82 connect the line direction computer to phase detector 80. Phase detector 80 supplies an output signal which is a function of the magnitude of the phase difference of the signals applied on leads 81 and 82. The output signal of phase detector 80 is applied to servo amplifier 83 through a connecting lead 84 which may include a blocking capacitor. The signal emerging on connecting output lead 84 is a direct current signal and the signal is formed into an alternating voltage by a chopper or vibrator 85 which intermittently connects lead 84 to ground through a connecting lead 86. Chopper 85 is driven by an alternating power source through a pair of connecting leads 87 and 88.

Discriminator 90 has the signal from servo amplifier 83 applied to its input through a connecting lead 91 and the output of discriminator 90 is applied to a motor generator 92 through a connecting lead 93. A rate feedback signal is applied from the velocity generator of motor generator 92 to servo amplifier 83 through a connecting lead 94 to provide proper damping for the servo loop including the motor generator 92. When motor generator 92 receives a signal, from discriminator 90, an output shaft 95 thereof is rotated to adjust line direction computer 75 and at the same time to position the rotor of synchro transmitter 96 to provide an output voltage representative of the rotational position of motor generator 92. It will be remembered that this position is representative of the relative bearing $\psi$ of the transmission line from the aircraft. This signal emerging from synchro transmitter 96 is applied to a line direction and distance indicator 97 through a connecting lead 100.

To determine the distance to the line from the aircraft a signal (h) is applied to a resolver amplifier 101 from line direction computer 75 through a connecting lead 102, the signal (h) being a function of the angle $\psi$ and of the X and Y components of the electric field. Another resolver amplifier 103 receives a signal on connecting lead 72 which is representative of the component of the electric field lying along the Z axis and after amplification in resolver amplifier 103 the signal is applied to a distance computer 104 through a connecting lead 105. The distance computer 104 is shown in block diagram form in FIG. 1B and in more detail in FIG. 4. The signal representative of the horizontal component h is amplified in resolver amplifier 101 and is applied to distance computer 104 through a connecting lead 106. Thus, distance computer 104 receives an amplified signal representative of the horizontal component h of the electric field and also receives an amplified signal representative of the vertical component Z of the electric field and these signals are applied to windings 200 and 201 of a synchro resolver which also includes output windings 202 and 203 (FIG. 4), the resolver being used as the distance computer 104. Referring to FIG. 1B, the output of distance computer 104 is applied to a phase detector 107 through a pair of connecting leads 110 and 111 to detect the angle between the major axis of the electric field ellipse and the horizontal plane. A direct current signal output is produced by phase detector 107 and is applied to a servo amplifier 112 through a connecting lead 113. The direct current signal is chopped by chopper 85, which is connected to lead 113 through a lead 114 to produce an alternating voltage as the signal input to servo amplifier 112. The signal is amplified by amplifier 112 and is applied to a discriminator 115 through a connecting lead 116 which in turn is applied to a suitable servo type motor generator 117 through a connecting lead 120. The signal from discriminator 115 causes motor generator 117 to rotate and a feedback signal from the velocity generator portion of motor generator 117 is applied to servo amplifier 112 through a connecting lead 121 to produce negative feedback and damping of the servo loop. As motor generator 117 is rotated, a shaft 122 is rotated and thereby rotates the rotor of the synchro including windings 202 and 203 (see FIG. 4) of the distance computer 104 to drive it to a position representative of the ratio of the Z component to the h component of the electric field. The ratio of Z to h gives a relative measure of the distance from the aircraft to the line. Shaft 122 is also connected to a potentiometer 123 which is excited by a suitable voltage source 124 so that an output signal indicative of distance to the line may be applied to line direction and distance indicator 97 through a connecting lead 125. Also, a signal representative of the vertical component Z of the electric field is applied to line direction and distance indicator 97 through a lead 126, connected to lead 72 at a junction point 72. This signal is used in determining the acquisition of a line and will be described in more detail below. From the description of the system as shown in the block diagrams of FIGS. 1A and 1B it will be noted that the electric field detected by the three sensors or detectors 20, 21 and 22 is transformed into usable electrical signals representing line direction and distance from the aircraft. Detectors 20, 21 and 22 in one embodiment are formed like a large capacitor and may employ the skin of the aircraft as one of the capacitor plates with a dielectric material being added to the skin of the plane and an outer metal covering placed over the dielectric to form the other plate. With this arrangement, one plate of the capacitor would be connected to the skin or ground of the system and the other plate would detect the change of the electric field in which it was entering. The configurations of the detectors will vary with the various aircraft.

Figure 3:
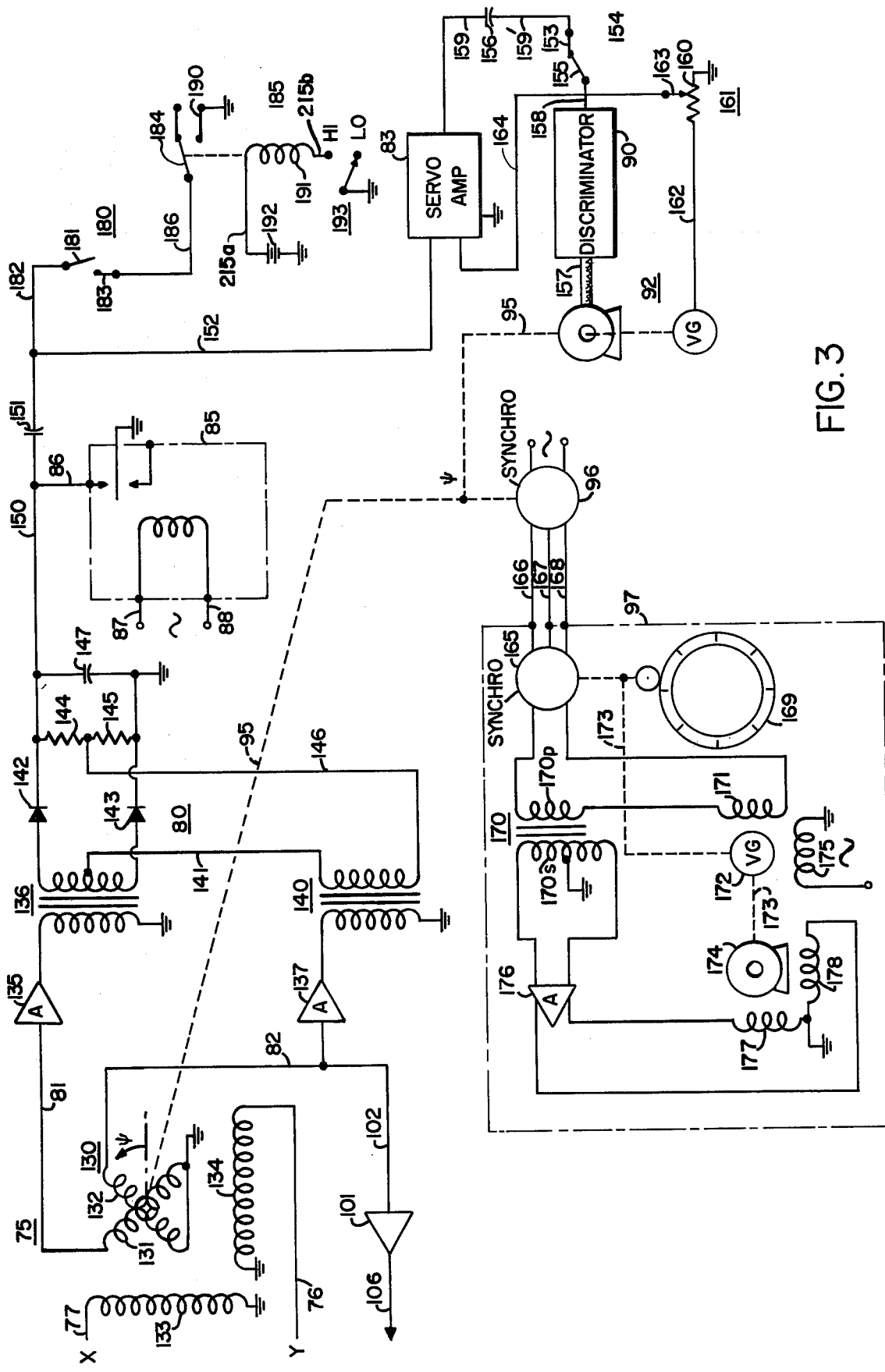
FIG. 3 is a schematic diagram of the line direction computer.

Referring to FIG. 3 a more detailed description will be given of the line direction computer which computes the angle between the power line and the horizontal projection of the aircraft heading. A synchro resolver 130 comprises a pair of rotor windings 131 and 132 which are fixed relative to each other and are mechanically coupled to shaft 95 and each of which is electrically connected at one end to ground. Resolver synchro 130 contains a pair of stationary windings 133 and 134 each of which has one end connected to ground. The other end of winding 133 is connected to lead 77 which carries a signal representative of the Y component of the electric field and the other end of winding 134 is connected to lead 76 carrying a signal representative of the X component of the electric field. In the resolver synchro, a magnetic field is formed by the stationary windings with a magnitude and direction determined by the relative magnitudes of the $E_X$ and $E_Y$ signals. Since the X and Y relative magnitudes are determined by the aircraft headings relative to the line direction, the magnetic field created within the resolver synchro is a source of line direction information. The signals from the two rotor windings of the resolver synchro are used as the inputs to phase sensitive detector 80. The signal appearing on connecting lead 81 is applied to an amplifier 135 which amplifies the signal and supplies it to the primary winding of a transformer 136. In like manner, an amplifier 137 receives the signal present on connecting lead 82. The amplified signal from amplifier 137 is applied to the primary winding of a transformer 140.

Transformer 136 has a secondary winding which is center tapped, the center tap being connected to one end of a secondary winding of transformer 140 through a connecting lead 141 and the two ends of the secondary winding of transformer 136 are connected to a pair of diodes 142 and 143. A pair of resistors 144 and 145 which are connected in series have their free ends connected to the unconnected terminals of diodes 142 and 143. The junction of series-connected resistors 144 and 145 is connected to the other end of the secondary winding of transformer 140 through a connecting lead 146. The use of diodes 142 and 143 allows current flow in a direction away from transformer 136 so that there is a unilateral flow of current in opposite directions across resistors 144 and 145 and this voltage is further smoothed by a filter capacitor 147 which is connected in parallel with the series connected resistors 144 and 145. One side of capacitor 147 is also connected to ground to provide a ground reference for the voltage which appears on the other side of the capacitor and this voltage is applied to one terminal of chopper 85 through a connecting lead 150.

In general, the magnitude of the voltage appearing at lead 150 is a function of the phase difference or phase angle between the secondary voltages of transformers 136 and 140. The polarity of the output voltage is determined by whether the phase angle is leading or lagging. The direct current signal at lead 150 is chopped by the chopper 85 and applied to servo amplifier 83 through a coupling capacitor 151 and a connecting lead 152. A fixed contact 153 of a relay 154 is connected to the output of servo amplifier 83 through a lead 159, a capacitor 156, and a lead 159'. A movable contact 155 of the relay 154 is normally in contact with relay contact 153 and is connected to discriminator 90 through a lead 158. Motor generator 92 has the output of discriminator 90 applied thereto through a connecting cable 157.

The output from the velocity generator of motor generator 92 is applied across the resistive element 160 of a potentiometer 161 through a connecting lead 162. The other end of resistive element 160 is connected to ground. Potentiometer 161 further comprises a wiper arm 163 which is connected to the input of servo amplifier 83 through a connecting lead 164 to provide negative feedback to servo amplifier 83 and provide the required damping for the servo loop.

Figure 5A:
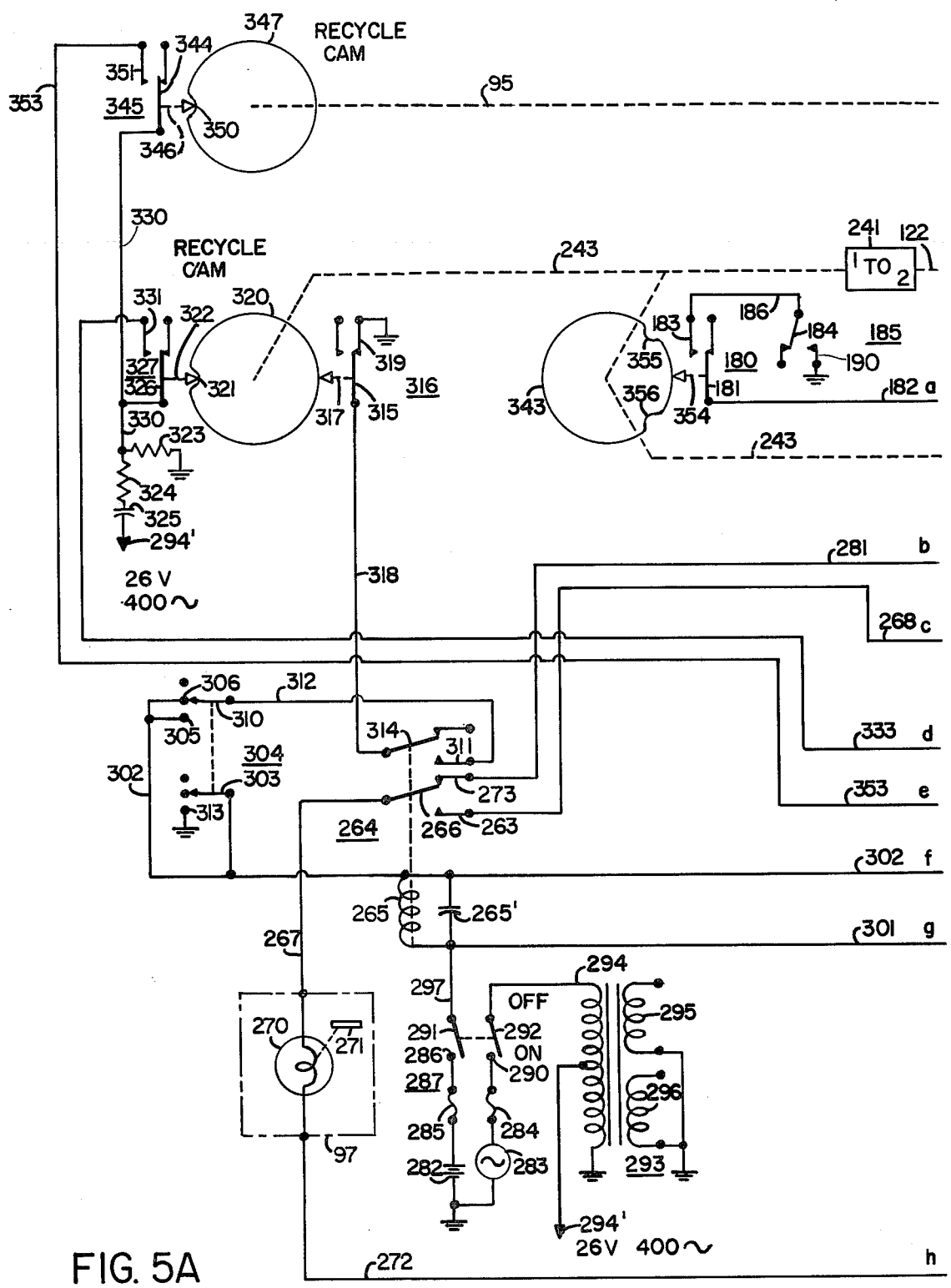
FIGS. 5A and 5B are a schematic diagram of the recycling circuits and lockout circuits.
Figure 5B:
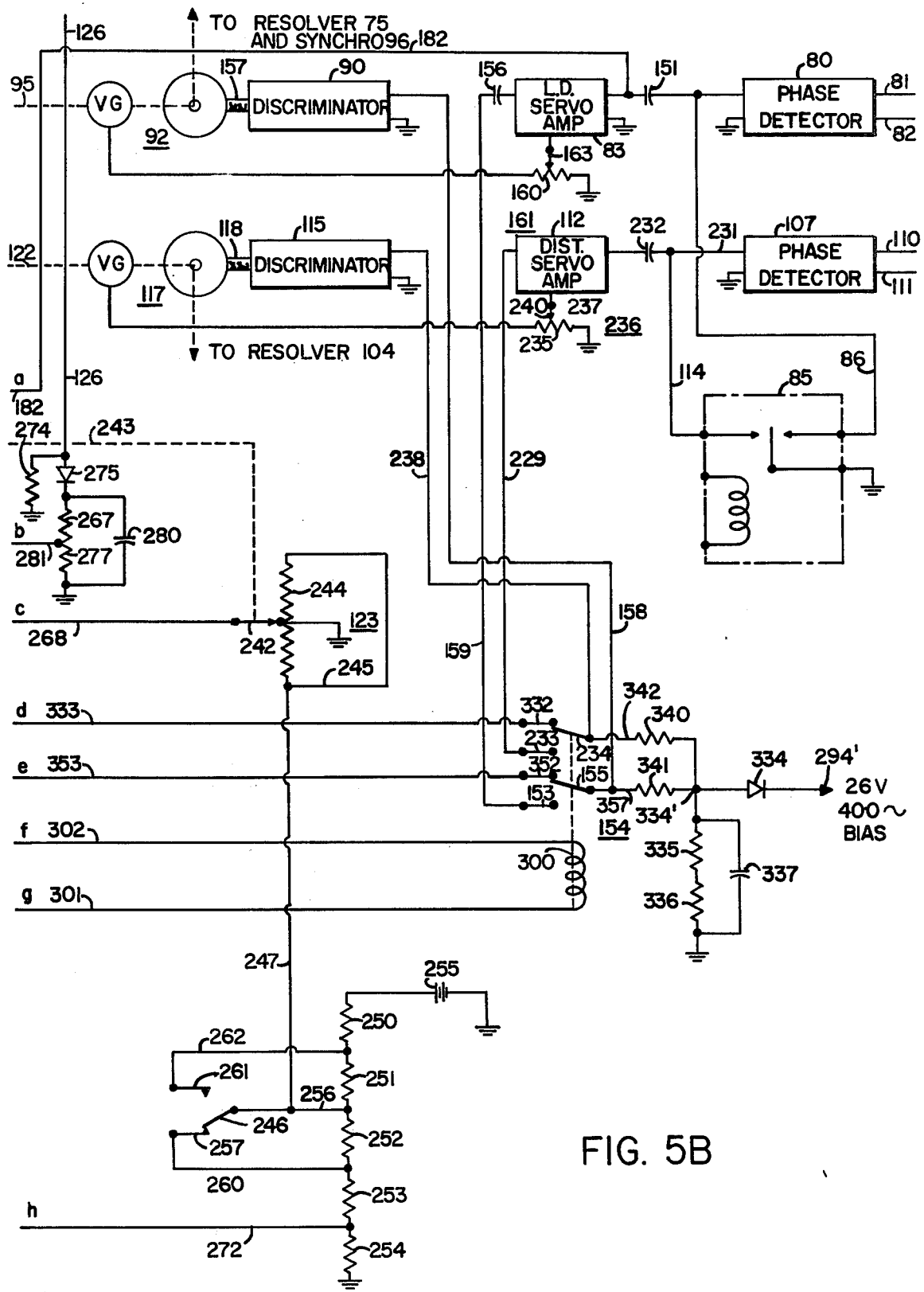

Motor generator 92 drives the resolver rotor containing windings 131 and 132 as long as an output voltage exists from the phase detector. The conditions for zero output from the phase detector are either a 90° phase angle between the secondary voltages from transformers 136 and 140 or a zero value for either of the secondary voltages. There are four rotor positions of resolver 75 separated from each other by 90° at which the output of the phase detector is zero. Two of said positions result in stable equilibrium of the servo system and the other two positions result in unstable equilibrium. A small displacement from an unstable equilibrium position develops a control signal to drive the resolver synchro rotor in a direction away from the unstable equilibrium position. A small displacement from a stable equilibrium position develops a control signal to drive the resolver back to the stable equilibrium position. The presence of two stable equilibrium positions represents a 180° ambiguity in line direction which must be accounted for and this is done in the recycle system which is shown in FIGS. 5A and 5B and which will be explained below.

As motor generator 92 rotates, shaft 95 is rotated and rotates the rotor of synchro transmitter 96 which is excited by a source of alternating voltage. Synchro 96 is conventional in form. The output signal from synchro transformer 96 is applied to a receiver synchro 165 which is a part of the line direction and distance indicator 97. Line direction and distance indicator 97 may be of the 331A-1 course indicator type manufactured by the Collins Radio Company of Cedar Rapids, Iowa. The signals from synchro transmitter 96 are transmitted to receiver synchro 165 through three connecting leads 166, 167, and 168. The signal from synchro receiver 165 is applied to the primary winding 170p of a transformer 170 having a center tapped secondary winding 170s, the tap being grounded. Connected in series with the primary winding of transformer 170 is the control winding 171 of a velocity generator 172 which is mechanically coupled by a shaft 173 to a motor 174. Thus the control signal output of synchro 165 and the negative feedback signal of velocity generator 172 are added and their resultant is applied as the control signal to primary 170p of transformer 170. An excitation winding 175 of velocity generator 172 is connected to ground at one end and to an alternating voltage source at the other end. An amplifier 176 is connected to the ends of secondary winding 170s of transformer 170 and functions to amplify the signal received from the transformer secondary 170s. The amplified signal from amplifier 176 is applied to the ends of a pair of motor windings 177 and 178 of the motor 174, the other winding ends being grounded. As shaft 173 is rotated, it positions the rotor of receiver synchro 165, so that the signal appearing on the primary winding 170p of transformer 170 is driven to a null value, and simultaneously rotates the relative bearing dial 169 of indicator 97.

For a certain mode of operation which will be described later, it is advantageous to lock the line direction computer in a fixed position and this is particularly true when the aircraft is directly over the line. Referring to FIG. 3, a cam operated switch 180 has a movable contact 181 which is connected by a lead 182 to the input lead 152 of the servo amplifier 83. Switch 180 is also described in more detail below. Contact 181 is normally out of engagement with contact 183. A stationary contact 183 of switch 180 is connected to a movable contact 184 of a relay 185 through a connecting lead 186. A stationary contact 190 of relay 185 is connected to ground. Contacts 184 and 190 of relay 185 are normally open. The relay 185 further comprises a relay winding 191 connected at one end through a lead 215a to a voltage source 192 which is referenced to ground. The other end of winding 191 is connected through a lead 215b to the "HI" fixed contact of a switch 193 which has a switch arm connected to ground. The switch arm has a "LO" position which opens the circuit for winding 191.

When switch 180 is closed so that movable contact 181 engages stationary contact 183, and if switch 193 is in the "HI" position, then the input lead 152 of the servo amplifier is grounded. The switch 193 in the "HI" position completes the energization circuit for relay 185 which causes movable contact 184 thereof to engage the grounded fixed contact 190. The input lead 152 is thus grounded through lead 182, engaged contacts 181 and 183 of switch 180, lead 186, and engaged contacts 184 and 190 of relay 185. The grounding of input lead 152 prevents any rotation of motor generator 92. The overall system function of switch 180 will be more fully explained in connection with FIG. 5A.

FIG. 2 is a schematic diagram of a roll and pitch coordinate translation computer which comprises the roll servo 44, the roll computer 52, the pitch servo 46 and the pitch computer 63. Roll and pitch computers 52 and 63 comprise resolvers having rotors which are positioned by their respective servos 44 and 46 in accordance with the angular roll and pitch signals from vertical gyro 43. The rotor 63r of pitch computer 63 is rotated through the pitch angle $\theta$ and the rotor 52r of the roll computer 52 is rotated through the roll angle $\phi$. The electric field vertical signal $e_{Z'}$ and the electric field lateral signal $e_{X'}$ are applied to the two stator windings $52_{s1}$ and $52_{s2}$ respectively of the roll computer 52. The output of one rotor winding $52_{r1}$ of resolver synchro is equal to $e_{X'} \cos \phi + e_{Z'} \sin \phi$ which is the desired lateral horizontal component signal $E_X$ and appears at lead 60. The output of the other rotor winding $52_{r2}$ of resolver synchro or roll computer 52 is $e_{Z'} \cos \phi - e_{X'} \sin \phi$. The last recited signal is applied to stator winding $63_{s1}$ of pitch resolver synchro or pitch computer 63 after being amplified by amplifier 62. The other stator winding $63_{s2}$ of pitch computer 63 is energized by the $e_{Y'}$ signal applied through lead 67. The output voltage induced in one of the rotor windings $63_{r1}$ is equal to $e_{Y'} \cos \theta - e_{Z'} \cos \phi \sin \theta + e_{X'} \sin \phi \sin \theta$ which is the desired forward component $E_Y$ of the electric field and appears on output lead 71. The output voltage induced in the other of the rotor windings $63_{r2}$ is equal to $e_{Z'} \cos \phi \cos \theta - e_{X'} \sin \phi \cos \theta + e_{Y'} \sin \theta$ which is the desired vertical component $E_Z$ of the electric field and appears on output lead 72. It is this coordinate transformation computer which resolves the electric field signals referred to aircraft reference coordinates, received from detectors 20, 21, and 22, into components representative of electric field signals referred to the earth coordinate system.

Figure 4:
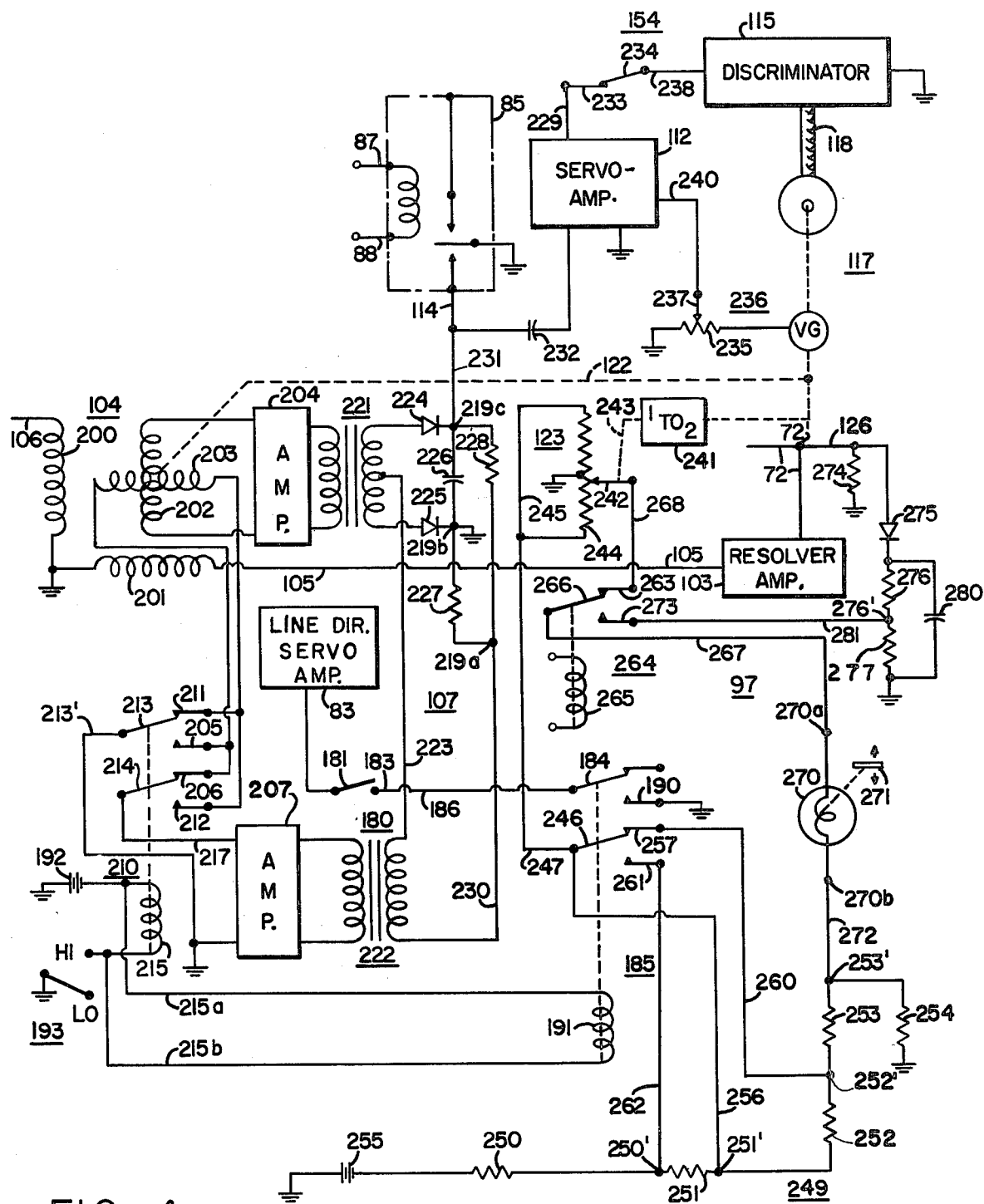
FIG. 4 is a schematic diagram of the distance computer.

Referring now to FIG. 4, distance computer 104 is in the form of a resolver synchro having rotor windings 202 and 203 and stationary windings 200 and 201. The stationary windings 200 and 201 each have one end connected to ground. The other end of winding 200 is connected to lead 106 which carries the signal $E_h$ and the other end of winding 201 is connected to lead 105 which carries the signal $E_Z$. The rotor winding 202 is connected to an amplifier 204 and one end of winding 203 is connected to a pair of relay contacts 205 and 206 of a reversing relay 210. The other end of rotor winding 203 is connected to a pair of contacts 211 and 212 of relay 210. A pair of movable contacts 213 and 214 of the relay 210 are mechanically linked together and are actuated by the coil 215 of relay 210. Movable contact 213 normally engages contact 211; upon energization of winding 215 contact 213 engages contact 205. Likewise, contact 214 normally engages contact 206; upon energization of winding 215 contact 214 engages contact 212. Movable contact 213 is connected to ground by a lead 213'. The relay coil 215 of relay 210 is connected in parallel with winding 191 of relay 185 by connecting leads 215a and 215b. Hence, the coil 215 is energized by operation of switch 193 when the movable arm thereof is displaced from the "LO" position to the "HI" position.

An amplifier 207 has a pair of input terminals, one of which is grounded. The other is connected by a lead 217 to movable contact 214 of relay 210. The function of the relay 210 is to provide a means for reversing the input to amplifier 207. As shown in FIG. 4, the signal from winding 203 of the resolver synchro is applied in one sense to amplifier 207. When relay 210 is energized, then the signal from winding 203 is applied to amplifier 207 in the reverse sense.

The output of amplifier 204 is applied to the primary winding of a transformer 221 and the output of amplifier 207 is applied to the primary winding of a transformer 222. One end of the secondary winding of transformer 222 is connected to a center tap of the secondary winding of transformer 221 through a connecting lead 223. The ends of the secondary winding of transformer 221 are connected respectively to first terminals of a pair of diodes 224 and 225. A capacitor 226 is connected between the other two terminals of diodes 224 and 225. Connected in parallel with capacitor 226 are a pair of series connected resistors 227 and 228. The junction point 219a between the series connected resistors is connected to the other end of the secondary winding of transformer 222 by a lead 230. The common junction 219b of diode 225, capacitor 226, and resistor 227 is connected to ground to furnish a ground reference. A direct current signal appears at the junction 219c of the connection between diode 224, capacitor 226, and resistor 228 and is supplied to chopper 85 through connecting leads 231 and 114 so that the direct current signal is converted into an alternating current signal which is applied to servo amplifier 112 through a blocking capacitor 232.

The operation of the distance computer circuit described thus far is identical to that described for the operation of the line direction computer shown in FIG. 3 with the slight variation created by the switching of relay 210 which as indicated reverses the sense of the signal to amplifier 207. Servo amplifier 112 amplifies the alternating voltage applied thereto which is a measure of the magnitude of the phase difference of the components $E_h$ and $E_Z$: these components describe the two axes of the ellipse as was previously discussed in connection with the means for determining the relative distance from the aircraft to the line. The amplified signal is applied through a lead 229 to a stationary contact 233 of relay 154 which is shown in more detail in FIG. 5B. Relay 154 has a movable contact 234 which is shown to be in engagement with the fixed contact 233 and is in the position shown when relay 154 is energized. The contact 234 is connected through a lead 238 to discriminator 115. The signal from servo amplifier 112 is thus applied to discriminator 115 when relay 154 is energized. Discriminator 115 supplies a voltage through a cable 118 to the motor of motor generator 117 and the velocity generator supplies a voltage which is applied to one end of the resistive element 235 of a potentiometer 236, the other end of resistive element 235 being connected to ground. A wiper arm 237 of potentiometer 236 is connected to servo amplifier 112 by a connecting lead 240. Since servo amplifier 112 is connected to ground a negative feedback signal is applied to servo amplifier 112 to provide a means of rate damping for the servo.

As motor generator 117 rotates, it rotates shaft 122 which is connected to rotor windings 202 and 203 of distance computer 104, and the rotation continues until the voltage appearing at servo amplifier 112 has been reduced to a null or zero value. As shaft 122 is rotated, it drives a 2 to 1 gear train 241 which increases the angle of rotation by a factor of two and the output of gear train 241 is connected to a wiper arm 242 of potentiometer 123 through a shaft 243. Potentiometer 123 has a resistive element 244, the ends of which are connected together by a connecting lead 245, and is also connected to ground through a center tap. The two ends of resistive element 244 are further connected to a movable contact arm 246 of relay 185 through a connecting lead 247.

A voltage divider 249 comprises five serially connected resistors 250, 251, 252, 253, and 254 having junction points 250', 251', 252', and 253'. The free end of resistor 254 is connected to ground. The free end of resistor 250 is connected to one terminal of a voltage source 255, and the other terminal of voltage source 255 is connected to ground to complete the current path through the voltage divider. Voltage source 255 is generally of the magnitude required to supply plate voltages for the electron tubes employed in the various amplifiers and discriminators. Movable contact 246 of relay 185 is connected to the junction 251' between resistor 251 and 252 by a connecting lead 256 so that a voltage is applied through lead 247 across the resistive element 244 of potentiometer 123. Movable contact 246 normally is in contact with its "out" contact 257 which in turn is connected to junction 252' between resistors 252 and 253 by a connecting lead 260. The "in" contact 261 for movable contact 246 is connected to the junction 250' between resistors 250 and 251 by a connecting lead 262. The voltage produced by potentiometer 123 and appearing on wiper arm 242 is applied to an "in" contact 263 of a relay 264. The "in" contact 263 is adapted to be engaged by a movable contact 266 of the relay 264, the contact 266 having an "out" contact 273. Relay 264 also has a coil 265 and the operation of this relay and coil will be more fully described in FIGS. 5A and 5B. In FIG. 4 the relay 264 is shown in the energized position which will be designated as the "engage" position.

The movable contact 266 is connected by a lead 267 to one side 270a of a meter movement 270 mounted for rotation with dial 169 in the line direction and distance indicator 97. Meter movement 270 is mechanically connected to a bar 271. Bar 271 is shown more clearly in FIG. 7B and it will be understood that bar 271 is capable of moving from the position near the top of the face of the indicator as shown in FIG. 7B to a position near the bottom of the face of indicator 97. The other side 270b of meter movement 270 is connected to the junction 253' of resistors 253 and 254 by a connecting lead 272. Since the voltage appearing on wiper arm 242 represents the relative distance of the aircraft from the line, as wiper arm 242 progresses from one side of resistive element 244 to the other side of 244 the bar will be seen to move from one extreme position to the other, passing through the center position where arm 242 makes contact with the grounded center tap portion of resistive element 244.

When relay coil 265 is unenergized and movable contact 266 makes contact with its "out" contact 273, meter movement 270 of indicator 97 is supplied with a signal which is representative of the electric field component $E_Z$ lying along the Z axis, and which appears on connecting lead 126. The voltage $E_Z$ is applied to one end of a resistor 274 which has its other end connected to ground. The alternating current signal passes through a diode 275 and the rectified voltage is then applied across a pair of serially connected resistors 276 and 277, resistor 276 being connected to diode 275 and resistor 277 having its other end connected to ground. A capacitor 280 is connected in parallel with the series connected resistors 276 and 277. Relay contact 273 is connected to the junction 276' of resistors 276 and 277 by a connecting lead 281. When contact 266 of relay 264 is engaging contact 273, then a signal which is a function of the vertical component $E_Z$ of the electric field is applied to meter movement 270 and this particular operation takes place in the "recycle" mode of operation thus causing bar 271 of indicator 97 to move downward upon the acquisition of a power line. This operation will be more fully explained later.

A discussion of the operation of the HI-LO switch 193 will now be set forth where the HI and LO designations refer to the altitude of the aircraft. More specifically the "HI" position is used when the aircraft is at an altitude above the earth greater than a predetermined level such as 5000 feet and only then if the horizontal distance from the line to the aircraft is less than the altitude of the aircraft. In other words, the switch 193 is moved to the "HI" position when the ratio of the altitude to the aircraft distance from the line is greater than 1 and the aircraft is higher than the predetermined level. The equipment should be engaged in the "LO" mode of operation when the horizontal distance to the line is greater than one altitude unit, that is, when the ratio of altitude to horizontal distance from the line is less than 1. The "LO" mode is also used when the aircraft is below the predetermined level. It will also be noted that when the HI-LO switch 193 is moved to the "HI" position so as to energize coil 191 of relay 185, the sensitivity of the distance indicator is adjusted by changing the voltage applied to potentiometer 123. This provides a better resolution of the relative distance in the "HI" mode of operation.

FIG. 6a depicts the horizontal and vertical components $E_h$ and $E_Z$ respectively as a function of horizontal distance (in altitude units) away from the line, the center of the abscissa indicating the position of the line. It will be noted that the horizontal component $E_h$ reaches a minimum at the line and the vertical component $E_Z$ reaches a maximum. This general relationship exists for all altitudes above the line. However, the relative magnitudes of the $E_h$ and $E_Z$ signals vary as a function of altitude. The presentation for FIG. 6a is for an altitude of 5000 feet.

FIG. 6b depicts the phase angle between the vertical and horizontal field components. The abscissa for FIG. 6b is the same as FIG. 6a. The ordinate is in degrees of phase shift.

FIG. 6c shows the electric field vector orientation and also has the same abscissa as FIG. 6a. The representation for FIG. 6c is for a relatively high altitude. The vector field orientation is also a function of altitude.

In FIG. 6c showing the field vector angle, it is seen that in the high mode of operation the electric field vector rotates through 360° in passing from a position of −2 through zero to +2. In the low operation, however, (not shown) the vector rotation is substantially twice that for the high altitude case in passing from a −2 position through zero to a +2 position. Due to these differences in ellipse orientation for line crossings made at low altitudes an ambiguity in the distance information displayed could exist. To remove this ambiguity, the HI-LO switch 193 is provided. It functions to reverse the polarity of winding 203 of resolver 204. This is accomplished by relay 210 being energized when switch 193 is displaced to the HI position. This causes the movable contacts 213 and 214 of relay 210 to be disengaged respectively from fixed contacts 211 and 206 and to engage respectively fixed contacts 205 and 212. With reference to FIG. 4, it will be noted that this action effectively reverses the connection of winding 203 to amplifier 207. The distance presentation is derived from potentiometer 123. The displacement of the potentiometer is proportional to the angle through which the ellipse axes have rotated. As was indicated for low altitudes, the rotation of the ellipse axes is twice as great for the same horizontal distance traveled perpendicular to the line as for the high altitude crossing. The HI-LO switch in the LO position functions to alter the voltage on potentiometer 244 to compensate for the increased angular displacement.

FIG. 5 shows a direct current power source 282 and an alternating current power source 283, each power source having one terminal thereof connected to ground. Power source 282 is connected through suitable fusing means 285 to a stationary contact 286 of a double pole single throw switch 287 which is designated as the power on-off switch. Power source 283 is connected through suitable fusing means 284 to a stationary contact 290 of switch 287. A pair of movable contact arms 291 and 292 of switch 287 are adapted to engage contacts 286 and 290 respectively to apply power to the system. A power transformer 293 has a primary winding 294 which is connected between switch arm 292 and ground. A pair of secondary windings 295 and 296 each have one of their terminals connected to ground and supply the various system alternating voltage requirements. Also, an alternating voltage may be obtained from a center tap 294' of the primary winding of transformer 293.

Direct current is applied to coil 265 of relay 264 from switch contact 291 through a connecting lead 297: the coil 300 of relay 154 is connected in parallel with coil 265 through leads 301 and 302. Lead 302 connected to coil 265 is further connected to a first switch arm 303 of a double pole switch 304 designated as the "engage-recycle" switch which controls the mode of operation of the system. Switch 304 is a three position switch and also includes a second switch arm 310. Switch 304 is shown in the normal position. In this position switch arm 303 engages an open contact and switch arm 310 engages a fixed contact 306. In an "engage" position of switch 304, the switch arm 303 engages a grounded contact 313 and switch arm 310 engages a contact 305. In a "recycle" position of switch 304, both switch arms engage open contacts. Lead 302 is also connected to switch contacts 305 and 306.

Switch arm 310 is connected through a lead 312 to an "in" contact 311 which is adapted to be engaged by a movable contact 314 of relay 264. Contact 314 is connected to a switch arm 315 of a switch 316 through a connecting lead 318. Switch arm 315 is operated by a cam follower 317 that follows a recycle cam 320 and this will be explained more fully below. Cam 320 is shown in its initial position and in this position switch arm 315 engages a contact 319 which is connected to ground. In the positions shown for switch 304 and relay 264, it will be noted that there is no return circuit to ground for relay coils 265 and 300 and accordingly they are not energized in this position. To place the system in operation switch 304 is turned to the "engage" position and in this position switch arm 303 engages switch contact 313 which thus energizes relay coils 265 and 300 thereby actuating relays 264 and 154. Switch 287 is of course in the "on" position. When switch arms 303 and 310 are released to return to their initial position a holding circuit is provided by movable contact 314 of relay 264 in engaging contact 311. Suitable means are provided to prevent relays 264 and 154 from dropping out during the switching of switch 304 from the "engage" position to the "normal" position as shown. The means shown is a capacitor 265' in parallel with winding 265.

As shown a second cam follower 322 is engaging the detent 321, when slider 242 is at the center tap of winding 244.

Assuming that the equipment has just been turned on, that is, switch 287 has been switched to the "on" position, and assuming that recycle cam 320 is not in the initial position as shown, but is in some secondary position, such that cam follower 322 is not in detent 321, the following operation takes place. The alternating voltage between conductor 294' and ground is applied across a series circuit comprising a first resistor 323, a second resistor 324 and a capacitor 325. A switch arm 326 of a switch 327 is connected to the junction of resistors 323 and 324 by a connecting lead 330. When cam follower 322 is not in detent 321, the voltage which appears on switch arm 326 is applied to a switch contact 331 and this contact is connected to an "out" contact 332 of relay 154 through a connecting lead 333. Contact 332 coacts with a switch arm 234 of relay 154.

A 26 volt 400 cycle signal is applied from lead 294' to a diode 334. Thus, alternate negative half cycles of voltage appear across a series circuit comprising a pair of resistors 335 and 336. Resistor 335 is connected to diode 334 and resistor 336 is connected to ground. Connected in parallel with the serially connected resistors 335 and 336 is a capacitor 337 which functions to smooth the voltage across resistors 335 and 336. The function of the diode 334, resistors 335 and 336, and capacitor 337 is to provide a negative bias voltage at the junction 334' of diode 334 and resistor 335. The bias voltage is applied to the ends of a pair of resistors 340 and 341. Resistor 340 is connected to movable switch arm 234 of relay 154 through a connecting lead 342, and provides a negative bias to discriminator 115 which is also connected to switch arm 234 through connecting lead 238. The negative bias keeps the discriminator in a non-conductive state. Upon receipt of the alternating voltage from contact 332 of relay 154, discriminator 115 is driven into conduction to cause motor generator 117 to drive in a predetermined direction due to the nature of the discriminator which has a particular reference voltage. Since motor generator 117 rotates shaft 122, gear train 241 is rotated and in turn drives shaft 243 to rotate cam 320 until cam follower 322 drops into the detent 321 and thereby removes the alternating voltage from discriminator 115 so that the distance servo is started from the same initial position of slider 242 for the beginning of each cycle of operation. Another cam 343 designated as the line direction lockout cam is also rotated by shaft 243 and the function of this cam will be explained subsequently.

Returning now to the voltage divider formed by resistors 323 and 324, it will be noted that lead 330 also supplies the alternating voltage to the switch arm 344 of switch 345. Switch arm 344 has mechanically connected to it a cam follower 346 which engages the surface of a recycle cam 347. Cam 347 has a detent therein adapted to coact with the cam follower 346. When cam follower 346 is out of the detent then the switch arm 344 engages a switch contact 351. Then the voltage at contact 344 is applied to switch contact 351 and to a contact 352 of relay 154 through a connecting lead 353. Returning again to the negative bias source it will be seen that the other end of resistor 341 is connected to movable contact 155 of relay 154 through a connecting lead 357 so that a negative bias signal is applied to discriminator 90 to keep the discriminator in a non-conducting state. The receipt of the alternating voltage on contact 352 from lead 353 through contact 155 and lead 158 causes discriminator 90 to be driven into a state of conduction and thereby cause motor generator 92 to rotate shaft 95 to rotate the recycle cam 347 until the detent 350 is engaged by the cam follower 346. At that point the motor generator 92 ceases to rotate because the energization to lead 353 is removed and the negative bias from the biasing network terminates the conduction of discriminator 90. It will be remembered that relay 264 has a holding circuit to keep coils 265 and 300 energized through lead 302, contact 306, switch arm 310, lead 312, relay contact 311, switch 314, lead 318, switch arm 315, and switch contact 319 to ground so that as long as cam follower 317 does not engage detent 321 the circuit remains closed.

As discussed previously, the HI mode of operation is generally restricted to flights where the horizontal distance of the craft from the transmission line is equal to or less than the altitude of the craft, while the LO operation extends to positions of the aircraft beyond this range. As was pointed out above in referring to FIG. 6, in the LO mode of operation the rotation of the electric field vector is twice that of the HI mode of operation. In the LO position, as the aircraft makes a line crossing, the voltage $E_h$ representative of the field vector causes the distance computer resolver synchro 104 to make a complete revolution while the output potentiometer 123 which has its wiper arm geared downward, rotates through 180°. Since the wiper recycle position is at the center of potentiometer 123, identical meter readings of meter 270 will result regardless of the direction of rotation of resolver synchro 104. The system as shown in FIG. 5 will be assumed to be in the LO mode of operation and therefore as recycle cam 320 rotates through 180°, due to the gear reduction ratio, the rotor of the distance computer 104 has rotated through 360° and the cam follower 317 falls into detent 321 thereby opening the holding circuit and allowing relay coil 265 to become deenergized and simultaneously deenergizing coil 300. When that occurs then the alternating voltage from the bridge divider 325-324-323 is once again applied to the discriminator circuits through the above recited means and motor generators 92 and 117 again drive their respective associated components until the recycle cams 320 and 347 have returned to the position shown in FIG. 5A where cam follower 322 engages detent 321 and where cam follower 346 engages detent 350.

When motor generator 117 rotates shaft 122 and line direction lockout cam 343 through gear train 241 and shaft 243, then switch 180, which has a cam follower 354 adapted to coact with cam 343 and which is connected to switch arm 181, may lock out the operation of motor generator 92 in determining the line direction. Cam 343 has a pair of detents 355 and 356 which are located 45° around the periphery of cam 343 from the initial point of cam follower 354 and 90° apart corresponding to 180° of rotation of shaft 122. This corresponds to the operation in the HI mode of operation. In the HI mode of operation relay 185 is energized and switch arm 184 thereof engages contact 190 which is connected to ground. In this mode of operation assuming that the aircraft is approaching a line from the direction marked −1 on FIG. 6, as cam 343 is rotated cam follower 354 will follow the cam and since the voltage representative of the horizontal component of the electric field goes to zero over the line, the cam follower 354 will fall in detent 355 thereby placing switch arm 181 at a ground potential so that the input to line distance servo amplifier 83 is grounded through connecting lead 182. Thus the lockout cam provides a means of immobilizing line direction servo amplifier 83 and motor generator 92 whenever the aircraft is directly over the line. The line direction computer is immobilized to prevent "creeping" in the absence of the horizontal signal over the line and may also avoid a false turn signal produced by a transposition of the line. Regardless of which way the line is approached or which way motor generator 117 is rotated, the line direction lockout will occur when the aircraft passes directly over the line.

After the equipment has been recycled either automatically or through actuation of the recycle engage switch 304, the equipment is in a condition to seek out and indicate a power line. When the equipment is in the recycled mode of operation, bar 271 of indicator 97 is used to indicate the signal level during the acquisition period which is the period when the aircraft is "acquiring" a power line to follow. The presence of a signal is indicated by the bar of indicator 97 as shown in FIG. 7B moving downward from its recycle position and the movement is proportional to the signal level. This may be also seen in FIG. 4 where the vertical component of a field about the line is used to indicate the presence of the field and when this has been detected, switch 304 is moved by some means such as by a pilot to the engage position and in this position the signal appearing on meter movement 270 is from potentiometer 123 which provides a voltage proportional to the distance from the line. During this same mode of operation, the direction to the line is displayed on the bearing dial 169 of indicator 97.

FIG. 7B shows indicator 97 in a position when the aircraft would be approaching the line at right angles and showing bar 271 in the recycle position. As the vertical field component is detected, bar 271 moves downward and at the appropriate point switch 304 is switched from the recycle to the engage position and bar 271 moves back to the uppermost position and then moves downward to indicate the vertical component of the electric field and thereby gives the relative position of the aircraft with respect to the line. FIG. 7A shows the various indicator displays that are presented to the pilot as he approaches the line and turns to the right to fly parallel with the line on the left hand side of the line.

An alternate form of indicator (not shown) is the use of cathode ray tubes or a dual beam cathode ray tube. Using this type of presentation, one type of cathode ray tube may display the projection of the field ellipse on the horizontal plane and the other cathode ray tube may display the projection of the field ellipse in the vertical plane. In this manner the relative heading angle between the aircraft and line appears directly on one cathode ray tube and the angle of the ellipse axis can be observed on the other. The amplitude variations of both horizontal and vertical components will appear in the display as well as the relative phase of the various components. This type of display provides a maximum of guidance information including the ability to recognize discontinuities in the power line.

Identification of discontinuities varies with the different locations on the line. The discontinuities change with altitude and displacement from the line. At lower altitudes a recognizable phase shift between the wing signal and nose signal occurs due to a transposition, while at high altitude phase shifts may be negligible. Amplitude changes however will always be evident and from these characteristics it may be seen that all available information may be utilized and analyzed in order to recognize and identify discontinuities.

FIG. 8 has been provided to depict the elliptical nature of the electric field signal at various horizontal (lateral) displacements of the aircraft relative to the line. In FIG. 8, the abscissa is in altitude units and the data presented is for field ellipse orientation at medium-low altitudes. It will be noted that the principal axis of the ellipse rotates as a function of the sense and magnitude of displacement away from the line.

While we have shown a specific embodiment of our invention, the invention should not be limited to the particular form shown, and we intend in the appended claims to cover all modifications which do not depart from the spirit and scope of the invention.

What we claim is:

1. Airborne apparatus for detecting the presence of electric fields associated with high voltage transmission lines of alternating current from an aircraft having pitch, roll, and yaw axes, said apparatus comprising: a pair of electrode sensors mounted opposite each other at equal distances from the roll axis and parallel to the pitch axis of said aircraft for detecting an electric field and producing first and second signals representative thereof; a third electrode sensor mounted on the nose of said aircraft coaxial with said roll axis for detecting the electric fields along said roll axis and producing a third signal representative thereof; a sum and difference circuit responsive to said first and second signals for producing signals representative of the sum of said signals and the difference of said signals; a first network connected to said sum and difference circuit and responsive to said difference signal for producing a signal proportional to a local horizontal component of said electric field parallel to said pitch axis; a second network connected to said third sensor and to said sum and difference circuit and responsive to said third signal and said sum signal for producing a signal proportional to a local vertical component of said electric field parallel to said yaw axis; a third network connected to said third sensor and responsive to said third signal for producing a signal proportional to a local horizontal component of said electric field parallel to said roll axis; roll and pitch computers responsive to said signals produced by said first, second, and third networks for transforming said signals in aircraft coordinates into signals representative in an earth coordinate system where the local yaw axis in aircraft coordinates remains substantially unchanged in earth coordinates; a line direction computer including a servo responsive to signals from said roll and pitch computers for computing the relative bearing of a transmission line with respect to said aircraft and the magnitude of the horizontal component of the electric field, said computer providing output signals representative thereof; a relative distance computer including a servo responsive to signals from said pitch computer and said line direction computer for computing the distance to said transmission line as a ratio of the horizontal distance from the line, to the aircraft altitude and providing an output signal representative thereof; a signal lockout device responsive to said signal provided by said distance computer and connected to said servo of said line direction computer for locking said servo of said line direction computer in a fixed position when said horizontal component has a zero value; a recycling device including a bias source connected to said servos of said line direction computer and said distance computer to return said servos to an initial position upon said distance computer servo being driven to a predetermined position; and an indicator responsive to the output signals from said line direction and distance computers to provide a display of the relative bearing and distance from said aircraft to said transmission line.

2. Airborne apparatus for detecting the presence of electric fields associated with high voltage transmission lines of alternating current from an aircraft having pitch, roll, and yaw axes, said apparatus comprising: a pair of electrode sensors mounted opposite each other at equal distances from the roll axis and parallel to the pitch axis of said aircraft for detecting an electric field and producing first and second signals representative thereof; a third electrode sensor mounted on the nose of said aircraft coaxial with said roll axis for detecting the electric field along said roll axis and producing a third signal representative thereof; a sum and difference circuit responsive to said first and second signals for producing signals representative of the sum of said signals and the difference of said signals; a first network connected to said circuit and responsive to said difference signal for producing a signal proportional to a local horizontal component of said electric field parallel to said pitch axis; a second network connected to said third sensor and to said circuit and responsive to said third signal and said sum signal for producing a signal proportional to a local vertical component of said electric field parallel to said yaw axis; a third network connected to said third sensor and responsive to said third signal for producing a signal proportional to a local horizontal component of said electric field parallel to said roll axis; roll and pitch computers responsive to said signals produced by said first, second, and third networks for transforming said signals in aircraft coordinates into signals in an earth coordinate system where the local yaw axis in aircraft coordinates remains substantially unchanged in earth coordinates; a line direction computer including a servo responsive to signals from said roll and pitch computers for computing the relative bearing of a transmission line with respect to said aircraft and the magnitude of the horizontal component of the electric field as a trigonometric function of the horizontal component of said electric field which is parallel with said roll axis to the horizontal component which is parallel with said pitch axis, said computer providing output signals representative thereof; a relative distance computer including a servo responsive to signals from said pitch computer and said line direction computer for computing the distance to said transmission line as a ratio of the horizontal distance from the line to the aircraft altitude and providing an output signal representative thereof; a signal lockout device responsive to said signal provided by said distance computer and connected to said servo of said line direction computer for locking said servo in a fixed position when said horizontal component has a zero value; and an indicator responsive to the output signals from said line direction and distance computers to provide a display of the relative bearing and distance from said aircraft to said transmission line.

3. Airborne apparatus for detecting the presence of electric fields associated with high voltage transmission lines of alternating current from an aircraft having pitch, roll, and yaw axes, said apparatus comprising: electrode sensor means mounted on said aircraft for detecting the electric field and producing first, second, and third signals representative thereof; a sum and difference circuit responsive to said first and second signals for producing signals representative of the sum of said signals and the difference of said signals; a first network connected to said sensor means and said circuit and responsive to said third signal and said sum signal for producing a signal proportional to a local vertical component of said electric field parallel to said yaw axis; a second network connected to said sensor means and to said circuit and responsive to said third signal and said difference signal for producing signals proportional to local horizontal components of said electric field parallel to said roll and pitch axes; roll and pitch computers responsive to said signals produced by said first and second networks for transforming said signals in aircraft coordinates into signals in an earth coordinate system where the local yaw axis in aircraft coordinates remains substantially unchanged in earth coordinates; a trigonometric computer including means responsive to signals from said roll and pitch computers for computing the relative bearing of a transmission line with respect to said aircraft and the magnitude of the horizontal component of the electric field, said computer providing output signals representative thereof; a ratio computer including a servo responsive to a signal from said pitch computer and the horizontal component signal from said trigonometric computer for computing the relative distance to said transmission line as a ratio of the horizontal distance from the line to the aircraft altitude and providing the output signal representative thereof; an automatic signal lockout device responsive to said signal provided by said ratio computer and connected to said servo of said trigonometric computer for locking said servo in a fixed position when said horizontal component has a zero value; and an indicator responsive to the output signals from said trigonometric and ratio computers to provide an indication of the relative bearing and distance from said aircraft to said transmission line.

4. Apparatus for detecting the presence of electric fields associated with high voltage transmission lines of alternating current from a dirigible craft having pitch, roll, and yaw axes, said apparatus comprising: a plurality of sensing means mounted on said dirigible craft for detecting the electric fields and producing at least three signals representative thereof; sum and difference means responsive to a pair of said signals representative of said electric field for producing signals representative of the sum of said signals and the difference of said signals; means connected to said sum and difference means and responsive to said sum and difference signals and another signal from said sensing means other than said pair of signals for producing signals proportional to local horizontal and vertical components of said electric field parallel to said pitch, roll, and yaw axes; transforming means responsive to said signals produced by said means connected to said sum and difference means for transforming said signals in dirigible craft coordinates into signals in an earth coordinate system where the local yaw axis remains substantially unchanged in earth coordinates; first computing means including servo means responsive to signals from said transforming means for computing the relative bearing of a transmission line with respect to said dirigible craft and the magnitude of the horizontal component of the electric field, said computing means providing output signals representative thereof; second computing means including servo means responsive to a signal from said transforming means and the horizontal component signal from said first computing means for computing the relative distance to said transmission line as a ratio of the horizontal distance from the line to the aircraft altitude and providing an output signal representative thereof; and signal responsive means responsive to the output signals from said first and second computing means to perform in supervisory function.

5. Apparatus usable by a dirigible craft having pitch, roll, and yaw axes for detecting electric fields about transmission lines, said apparatus comprising: first means responsive to the electric field about a transmission line of alternating current to provide output signals proportional to and representative of the orthogonal components of said electric field; second means responsive to said output signals from said first means for transforming said signals from a coordinate system descriptive of said dirigible craft into output signals in a coordinate system representative of the earth where the yaw axis of each coordinate system remains substantially the same; third means responsive to said output signals from said second means for computing the relative bearing of said dirigible craft to said transmission line and producing output signals representative thereof; fourth means responsive to said output signals from said second and third means for computing a function of the distance from said dirigible craft to said transmission line and producing output signals representative thereof; and fifth means responsive to said output signals from said third and fourth means to perform in supervisory function in accordance with the phase and magnitude of said output signals.

6. Apparatus useable by a dirigible craft having pitch, roll, and yaw axes for detecting electric fields about transmission lines, said apparatus comprising: first means responsive to the electric field about a transmission line of alternating current to provide output signals proportional to and representative of the orthogonal components of said electric field; second means responsive to said output signals from said first means for transforming said signals from a coordinate system descriptive of said dirigible craft into output signals in a coordinate system representative of the earth where the yaw axis of each coordinate system remains substantially the same; third means responsive to said output signals from said second means for computing the relative bearing of said dirigible craft to said transmission line and producing output signals representative thereof; fourth means responsive to said output signals from said second and third means for computing a function of the distance from said dirigible craft to said transmission line and producing output signals representative thereof; fifth means responsive to said output signals from said third and fourth means to perform a supervisory function.

7. Apparatus useable by a dirigible craft having pitch, roll, and yaw axes for detecting electric fields about transmission lines, said apparatus comprising: first means responsive to the electric field about a transmission line of alternating current to provide output signals proportional to and representative of the orthogonal components of said electric field; second means responsive to said output signals from said first means for transforming said signals from a coordinate system descriptive of said dirigible craft into output signals in a coordinate system representative of the earth where the yaw axis of each coordinate system remains substantially the same; third means responsive to said output signals from said second means for computing the relative bearing of said dirigible craft to said transmission line and producing output signals representative thereof; fourth means responsive to said output signals from said second and third means for computing a function of the distance from said dirigible craft to said transmission line and producing output signals representative thereof; and fifth means responsive to said output signals from said third and fourth means for displaying the quantities computed.

8. Apparatus usable by a dirigible craft having pitch, roll, and yaw axes for detecting an electric field about a transmission line, said apparatus comprising: first means responsive to the electric field about a transmission line of alternating current to provide output signals indicative of the orthogonal components of said electric field; second means connected to said first means and responsive to said output signals from said first means for transforming said signals from a first coordinate system descriptive of said dirigible craft to a second coordinate system representative of the earth where the yaw axis of each coordinate system remains substantially the same; third means connected to said second means and responsive to said transformed signals from said second means for computing the relative bearing of said dirigible craft to said transmission line and producing output signals representative thereof; fourth means connected to said second and third means and responsive to output signals from said second and third means for computing a function of the distance of said dirigible craft from said transmission line and producing output signals representative thereof; and fifth means responsive to said output signals from said third and fourth means for displaying the quantities computed.

9. Apparatus useable by a dirigible craft having pitch, roll, and yaw axes for detecting an electric field about a high voltage conductor, said apparatus comprising: first means responsive to the electric field about a high voltage conductor of alternating current to provide output signals indicative of the orthogonal components of said electric field; second means connected to said first means and responsive to said output signals from said first means for transforming said signals from a first coordinate system descriptive of said dirigible craft into a second coordinate system; third means responsive to said output signals from said second means for computing the relative bearing of said dirigible craft to said conductor and producing an output signal representative of said relative bearing; fourth means responsive to output signals from said second and third means for computing a function of the distance from said dirigible craft to said transmission line and producing an output signal representative to said distance; and fifth means responsive to said output signals from said third and fourth means for performing a supervisory function.

10. In a supervisory system by means of which a dirigible craft may be controlled, means on said craft for detecting the orthogonal components of an alternating electric field moving relative to said craft and for providing a plurality of signals indicative of said orthogonal components of said electric field; second means connected to said first means and responsive to said signals for computing a function of the distance of said craft to the originating source of said alternating electric field and for producing a signal indicative of said computed function; and means connected to receive the signal produced by said second means.

11. Means for determining the position of a body with respect to at least one electric induction field source, comprising, in combination: a plurality of field sensors positioned at spaced locations on the body for exposure to the field, so that voltages appear on said sensors determined by the field; means actuated in accordance with said voltages for giving signals representative of the components of the field along orthogonal axes of said body; and means actuated in accordance with said signals to give an output representative of the position of said body with respect to the source.

12. Means for determining the orientation of a body with respect to at least one electric induction field source, comprising, in combination: a plurality of field sensors positioned at spaced locations on the body for exposure to the field, so that voltages appear on said sensors determined by the field; means actuated in accordance with said voltage for giving signals representative of the components of the field along orthogonal axes of said body; and means actuated in accordance with said signals to give an output representative of the orientation of said body with respect to the source.

13. Means for deriving intelligence from an electric induction field, comprising, in combination: a plurality of field sensors arranged for exposure to different portions of the field, so that voltages appear on said sensors determined by the strengths of said different portions; means actuated in accordance with said voltages for giving signals representative of predetermined characteristics of the field; and means actuated in accordance with said signals to give an output representative of a variable which is a function of at least one of said characteristics.

14. Means for deriving intelligence from an electric induction field comprising, in combination: a plurality of field sensors arranged for exposure to different portions of the field, so that voltages appear on said sensors determined by the strengths of said different portions thereof; means actuated in accordance with said voltages for giving signals representative of predetermined characteristics of the field; and means actuated in accordance with said signals to give an output representative of a variable which is a function of said characteristics.

15. Communication apparatus comprising; in combination: transmission means supplying an electric induction field having a remote characteristic which varies recognizably with a datum to be communicated; reception means for remotely determining said characteristic of said field; and supervisory means connected to said reception means for actuation in accordance with the characteristic so determined.

* * * * *